(12) United States Patent
Pan et al.

(10) Patent No.: US 9,138,737 B2
(45) Date of Patent: Sep. 22, 2015

(54) METHOD FOR REGULATING THE DISTRIBUTION OF METALLIC NANOPARTICLES WITHIN THE RESIN SUPPORT

(75) Inventors: Bingcai Pan, Jiangsu (CN); Zhenmao Jiang, Jiangsu (CN); Weiming Zhang, Jiangsu (CN); Lu Lv, Jiangsu (CN); Yingmei Xie, Jiangsu (CN); Quanxing Zhang, Jiangsu (CN)

(73) Assignee: NANJING UNIVERSITY (CN)

(*) Notice: Subject to any disclaimer, the term of this patent is extended or adjusted under 35 U.S.C. 154(b) by 0 days.

(21) Appl. No.: 13/818,773

(22) PCT Filed: May 3, 2011

(86) PCT No.: PCT/CN2011/073595
§ 371 (c)(1),
(2), (4) Date: Feb. 25, 2013

(87) PCT Pub. No.: WO2012/106854
PCT Pub. Date: Aug. 16, 2012

(65) Prior Publication Data
US 2013/0310243 A1    Nov. 21, 2013

(30) Foreign Application Priority Data
Feb. 12, 2011    (CN) .......................... 2011 1 0036805

(51) Int. Cl.
*B01J 37/30* (2006.01)
*B01J 35/00* (2006.01)
(Continued)

(52) U.S. Cl.
CPC ......... *B01J 37/30* (2013.01); *B01J 31/08* (2013.01); *B01J 35/004* (2013.01); *B01J 37/16* (2013.01); *B01J 41/14* (2013.01); *B01J 45/00* (2013.01); *B01J 47/006* (2013.01); *C23C 18/1216* (2013.01); *C23C 18/1233* (2013.01); *C23C 18/1287* (2013.01); *C23C 18/1644* (2013.01); *C23C 18/1658* (2013.01); *C23C 18/1666* (2013.01)

(58) Field of Classification Search
CPC ............ B01J 37/30; B01J 37/16; B01J 45/00; B01J 39/18; B01J 35/004; C23C 18/1658; C23C 18/1644; C23C 18/1666; C23C 18/1233; C23C 18/1287; C23C 18/1216
USPC ........ 502/5, 50, 159, 338, 339, 340; 977/773, 977/777; 428/502, 546
See application file for complete search history.

(56) References Cited

U.S. PATENT DOCUMENTS
3,578,609 A * 5/1971 Haag et al. .................... 502/159

FOREIGN PATENT DOCUMENTS
CN    1772370 A    5/2006
CN    101474560 A *  7/2009
(Continued)

OTHER PUBLICATIONS

Kralik et al., "Catalysis by metal nanoparticles supported on functional organic polymers," Journal of Molecular Catalysis A: Chemical 177 (2001) 113-138.*

(Continued)

*Primary Examiner* — Anthony J Zimmer
(74) *Attorney, Agent, or Firm* — Schmeiser, Olsen & Watts, LLP

(57) ABSTRACT

A method for regulating the distribution of metallic nanoparticles within the resin support is provided. This method uses the ion exchange or absorption resin bearing basic functional groups as the support; firstly introducing the metal in the form of anionic complexes onto the resin support through the ion exchange process, then realizing the purpose of regulating the distribution of the metal and its compound within the resin support by means of changing the concentration of the reductive or deposition agent in water solution and the reaction time. The regulated distribution of metallic nanoparticles within the resin support is in the form of rings with different depths and densities. The different distribution patterns result in improvements upon properties of the inorganic-organic composite material, such as reaction activity, reaction selectivity and metallic stability, and has significant referential value for preparation and structural regulation of other inorganic-organic composite materials of the same kind.

18 Claims, 3 Drawing Sheets

Fe Ka1

(51) Int. Cl.
*B01J 37/16* (2006.01)
*C23C 18/12* (2006.01)
*C23C 18/16* (2006.01)
*B01J 31/08* (2006.01)
*B01J 45/00* (2006.01)
*B01J 41/14* (2006.01)
*B01J 47/00* (2006.01)

(56) References Cited

FOREIGN PATENT DOCUMENTS

| CN | 101716525 | A |   | 6/2010 |
|----|-----------|---|---|--------|
| CN | 101716525 | B | * | 8/2012 |

OTHER PUBLICATIONS

Gasparovicova, D., Kralik, M., Hronec, M., et al.,"Reduction of nitrates dissolved in water over palladium-copper catalysts supported on a strong cationic resin." Journal of Molecular Catalysis A: Chemical, 2006, vol. 244, 1 pg.

Gasparovicova, D. et al.; "Supported Pd—Cu catalysts in the water phase reduction of nitrates: Functional resin versus alumina", Journal of Molecular Catalysis A: Chemical, 2007, vol. 264, 1 pg.

Gu, Cheng et al.: Synthesis of Highly Reactive Subnano-Sized Zero-Valent Iron Using Smectite Clay Templates; Environmental Science and Technology, 2010, publication date: May 6, 2010, 1 pg.

International Search Report; PCT/CN2011/073595; Int'l File Date: May 3, 2011; Nanjing University; 5 pgs.

* cited by examiner

METHOD FOR REGULATING THE DISTRIBUTION OF METALLIC NANOPARTICLES WITHIN THE RESIN SUPPORT

FIELD OF THE TECHNOLOGY

This following relates to a method for regulating the distribution of metallic nanoparticles within the resin support, and more specifically to such a method realized by changing the diffusivity of a reductive or a deposition agent.

BACKGROUND

The metallic organic-inorganic composite materials are widely utilized in such fields as environmental protection industry and catalysis in chemical industry. Currently, the researches are mainly focused on the preparation method, structural characterization and working performance of these composite materials while the researches on the structural regulation of these materials and its according effects upon the properties of the regulated materials are seldom reported. Some researchers outside China, when adopting palladium-copper (Pd—Cu) bimetallic composite catalyst supported by the anion exchange resin and γ-aluminum oxide (γ-$Al_2O_3$) to reduce nitrates, found that the metallic catalyst reduced by low partial pressure of $H_2$ was distributed around the outer part of the support whereas the metallic catalyst reduced by $NaBH_4$ was evenly distribution within the whole support. The metallic catalyst distributed around the outer part of the support presented higher activity, higher selectivity for nitrogen gas ($N_2$) and less loss of the metal; in comparison, the metallic catalyst evenly distributed within the support presented lower activity, lower selectivity for $N_2$ and more loss of the metal (Gašparovičová, D., Králik, M., Hronec, M., et al., "Reduction of nitrates dissolved in water over palladium-copper catalysts supported on a strong cationic resin." *Journal of Molecular Catalysis A: Chemical* 2006, 244, 258-266; Gašparovičová, D., Králik, M., Hronec, M., et al., "Supported Pd—Cu catalysts in the water phase reduction of nitrates: Functional resin versus alumina." *Journal of Molecular Catalysis A: Chemical* 2007, 264, 93-102). Some other researchers, when adopting montmorillonite as the template and support in preparing subnanosized zerovalent iron (ZVI), found that as the mole ratio of $NaBH_4$/Fe(III) goes up, the content of ZVI will increase accordingly, and its efficiency in reducing nitrobenzene into aminobenzene will enhanced as well (Gu, C., Jia, H. Z., Li, H., et al., "Synthesis of highly reactive subnanosized zero-valent iron using smectite clay templates." *Environmental Science & Technology* 2010, 44, 4258-4263.).

In 2009, (China) Nanjing University successfully applied for a patent: "Method for Preparing a Resin-supported Dearsenic Absorbent" (ZL 200510095177.5). This patent disclosed a method to load particles of the hydrated iron oxide (HFO) onto the surface of the anion exchange resin. In 2009, (China) Nanjing University successfully applied for a patent: "Nanocomposite Resin Loaded with Zerovalent Iron for Catalytic Degradation of Pollutants and the Preparation Method Thereof" (Application Number: 200910028413.X; Publication Number: CN101474560). This patent disclosed a method to load the nanoparticles of zerovalent iron onto the resin support bearing anion exchange groups. In 2009, (China) Nanjing University successfully applied for a patent: "CdS-loaded Composite Material Supported by the Anion Exchange Resin and the Preparation Method Thereof" (Application Number: 200910232275.7; Publication Number: CN101716525A). This patent disclosed a method to load the nanoparticles of cadmium sulfide (CdS) onto the resin support bearing anion exchange groups. None of these documents covered any information about regulating the distribution of inorganic metallic particles and the according effects upon their properties.

SUMMARY

1. The Technical Problems to be Solved

An object of this invention is to provide a method for regulating the distribution of metallic nanoparticles within the resin support, and more specifically to provide a method for regulating the distribution of metallic nanoparticles within the resin support by means of changing the reduction rate or deposition rate of the metal within the resin phase.

2. Technical Solutions

The principle of this invention lies in using the basic anion exchange resin as the support, introducing thereon anionic complexes such as $FeCl_4^-$, $CdCl_4^{2-}$ and $PdCl_4^{2-}$, and then fixating the metallic nanoparticles onto the resin so processed with a reductive or a deposition agent. This fixation procedure is characteristic of two simultaneous processes: on the one hand, metallic inorganic anionic complexes such as $FeCl_4^-$, $CdCl_4^{2-}$ and $PdCl_4^{2-}$ are hydrolyzed in water solution, which results in gradual loss of the metal in the form of cations; on the other hand, the said reduction or deposition process can effectively fixate the metal and its compound onto the support. This invention attempts to regulate the distribution pattern of the metallic nanoparticles within the resin phase through changing the intensity contrast of the said two processes, which is realized by controlling the diffusivity of the said reductive or deposition agent. The faster the reduction or deposition process, the more intense the contrast, and the evener the distribution of the metal and its compound within the resin support (namely, the broader of the distribution ring).

A method for regulating the distribution of metallic nanoparticles within the resin support, consisting of the following steps:

(A) using the styrenic or acrylic ion exchange resin bearing basic functional groups as the support, introducing anionic complexes such as $FeCl_4^-$, $CdCl_4^{2-}$ and $PdCl_4^{2-}$ in water solution onto the resin through ion exchange process;

(B) adopting a reductive or a deposition agent to fixate the metal within the resin support through reduction or deposition process; as the concentration of the reductive or deposition agent increases and the reaction time extends, the distribution ring of metallic nanoparticles within the resin support increases inwardly both in depth and in density.

The support mentioned in step (A) is the ion exchange and absorption resin bearing basic functional groups. The said resin have a styrenic or acrylic matrix containing tertiary ammonium groups, quarternary ammonium groups or basic heterocyclic groups; the average pore size of the resin is 1-100 nm.

The support resin mentioned in step (A) can be resin D-201, D-301, NDA-900, Amberlite IRA-900, Amberlite IRA-958, Amberlite IRA-96, Purolite C-100, Purolite A500, WBR109, NDA-88 or NDA-99.

The concentration of the metallic inorganic anionic complexes such as $FeCl_4^-$, $CdCl_4^{2-}$ and $PdCl_4^{2-}$ in water solution mentioned in step (A) is 0.1-2 mol/L, and the solid-liquid ratio between the resin support and the solution containing metallic anionic complexes is 0.1-20 g/L.

The reductive mentioned in step (B) is sodium borohydride ($NaBH_4$) or potassium borohydride ($KBH_4$), and the deposition agent mentioned in step (B) is sodium hydroxide (NaOH) or sodium sulfide ($Na_2S$); the concentration of the reductive or deposition agent is 0.5%-10% by mass ratio, and the solid-liquid ratio between the resin support and the solution containing the reductive or deposition agent is 0.1-20 g/L.

The reaction time of the process mentioned in step (B) is 0.5-30 min, and ultrasonic oscillation or agitation is required during the reduction or deposition process.

The metal and its compound mentioned in step (B) include but not limited to HFO, CdS, zerovalent iron and zerovalent palladium.

The ratio between the depth of the distribution ring formed by the metallic nanoparticles within the resin support and the section radius of the support resin is 5%-100%.

3. Beneficial Effects

This invention provides a method for regulating the distribution of metallic nanoparticles within the resin support; this method realizes artificial regulation of the distribution ring formed by the nanoparticles of the metal and its compound within the resin support; the ratio between the said distribution ring and the section radius of the support resin is 5%-100%. The different distribution patterns of the metal so obtained result in great improvements upon the properties (for example, reaction activity, reaction selectivity and metallic stability) of the inorganic-organic composite material. The metallic composite materials with thinner distribution ring can be adopted in preparing the high-performance composite photocatalyst while those with broader distribution ring can be widely exploited in oxidation-reduction reaction due to many advantages, such as higher chemical activity, faster reaction rate and less loss of the metal, shown in these materials.

DETAILED DESCRIPTION

This invention is more specifically described in the following embodiments

Embodiment 1

Figure 1:
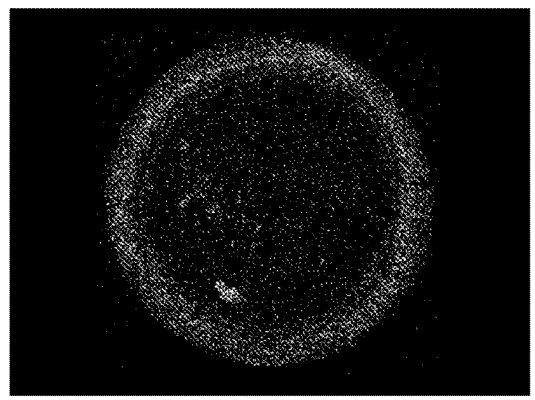
FIG. 1 is the SEM image of the material prepared in embodiment 1.

Adding 5 g resin D-201 into 2 mol/L $FeCl_4^-$ solution, and keeping the solid-liquid ratio at 10 g/L. oscillating the mixture, leaving $FeCl_4^-$ and the resin for 4 hours of ion exchange reaction and then filtering the mixture. Mixing the material so obtained with 0.9% $NaBH_4$ or $KBH_4$ solution (by weight), leaving for 15 minutes of reaction under ultrasonic oscillation, and then washing the material with deoxygenated water. vacuum drying the material at 40° C. for 24 hours. The nano-sized zerovalent iron so obtained is distributed around the outer part of the resin support. The depth of distribution is about 25% of the section radius of the support. The SEM image of this material is shown in FIG. 1.

The composite material so obtained is utilized to reduce 50 mg/L $NO_3^-$—N; when the initial pH value of the solution is 2, the conversion rate is 40% and the loss rate of iron is 90%; when the initial pH value of the solution is 6, the generation rate of the product $NH_4^+$ is 0.010 $min^{-1}$.

Embodiment 2

Figure 2:
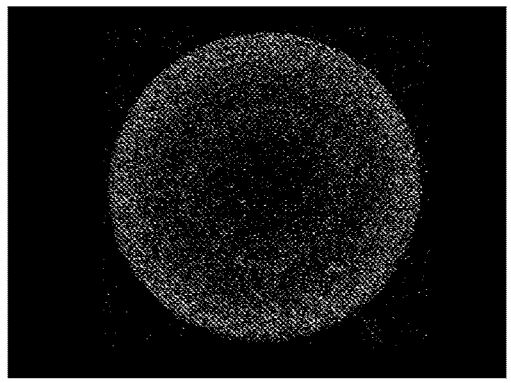
FIG. 2 is the SEM image of the material prepared in embodiment 2.

Adding 5 g resin D-201 into 2 mol/L $FeCl_4^-$ solution, and keeping the solid-liquid ratio at 10 g/L; oscillating the mixture, leaving $FeCl_4^-$ and the resin for 4 hours of ion exchange reaction and then filtering the mixture. Mixing the material so obtained with 1.8% $NaBH_4$ or $KBH_4$ solution, leaving for 15 minutes of reaction under ultrasonic oscillation, and then washing the material with deoxygenated water; vacuum drying the material at 40° C. for 24 hours; the nanosized zerovalent iron so obtained is distributed around the outer part of the resin support; the depth of distribution is about 50% of the section radius of the support; the SEM image of this material is shown in FIG. 2.

The composite material so obtained is utilized to reduce 50 mg/L $NO_3^-$—N; when the initial pH value of the solution is 2, the conversion rate is 44% and the loss rate of iron is 76%; when the initial pH value of the solution is 6, the generation rate of the product $NH_4^+$ is 0.018 $min^{-1}$.

Embodiment 3

Figure 3:
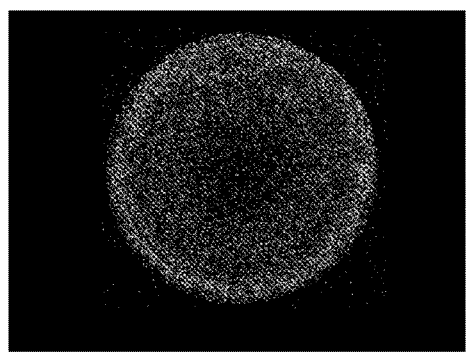
FIG. 3 is the SEM image of the material prepared in embodiment 3.

Adding 5 g resin D-201 into 2 mol/L $FeCl_4^-$ solution, and keeping the solid-liquid ratio at 10 g/L; oscillating the mixture, leaving $FeCl_4^-$ and the resin for 4 hours of ion exchange reaction and then filtering the mixture; mixing the material so obtained with 3.6% $NaBH_4$ or $KBH_4$ solution, leaving for 15 minutes of reaction under ultrasonic oscillation, and then washing the material with deoxygenated water; vacuum drying the material at 40° C. for 24 hours; the nanosized zerovalent iron so obtained is distributed around the outer part of the resin support; the depth of distribution is about 80% of the section radius of the support; the SEM image of this material is shown in FIG. 3.

The composite material so obtained is utilized to reduce 50 mg/L $NO_3^-$—N; when the initial pH value of the solution is 2, the conversion rate is 45% and the loss rate of iron is 73%; when the initial pH value of the solution is 6, the generation rate of the product $NH_4^+$ is 0.021 $min^{-1}$.

Embodiment 4

Figure 4:
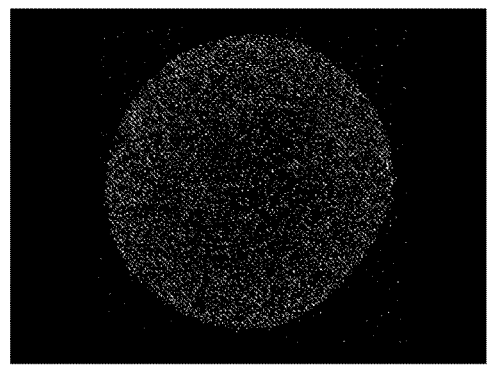
FIG. 4 is the SEM image of the material prepared in embodiment 4.

Adding 5 g resin D-201 into 2 mol/L $FeCl_4^-$ solution, and keeping the solid-liquid ratio at 10 g/L; oscillating the mixture, leaving $FeCl_4^-$ and the resin for 4 hours of ion exchange reaction and then filtering the mixture. mixing the material so obtained with 7.2% $NaBH_4$ or $KBH_4$ solution, leaving for 15 minutes of reaction under ultrasonic oscillation, and then washing the material with deoxygenated water; vacuum drying the material at 40° C. for 24 hours; the nanosized zerovalent iron so obtained is distributed around the outer part of the resin support. The depth of distribution is about 100% of the section radius of the support; the SEM image of this material is shown in FIG. 4.

The composite material so obtained is utilized to reduce 50 mg/L $NO_3^-$—N; when the initial pH value of the solution is 2, the conversion rate is 49% and the loss rate of iron is 70%; when the initial pH value of the solution is 6, the generation rate of the product $NH_4^+$ is 0.024 $min^{-1}$.

Embodiment 5

Figure 5:
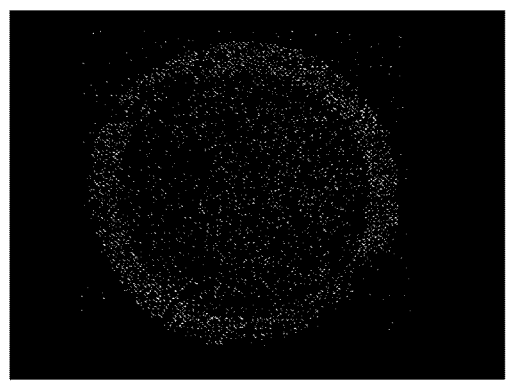
FIG. 5 is the SEM image of the material prepared in embodiment 5.

Adding 5 g resin D-201 into 0.1 mol/L $CdCl_4^{2-}$ solution, and keeping the solid-liquid ratio at 0.1 g/L; oscillating the mixture, leaving $CdCl_4^{2-}$ and the resin for 24 hours of ion exchange reaction and then filtering the mixture; mixing the material so obtained with 1.0% $Na_2S$ solution, leaving for 0.5 minute of reaction under ultrasonic oscillation, and then washing the material with distilled water; vacuum drying the material at 40° C. for 24 hours; the nanosized CdS so obtained is distributed around the outer part of the resin support. The depth of distribution is about 10% of the section radius of the support; the SEM image of this material is shown in FIG. 5.

The composite material so obtained is utilized to degrade 50 mL of 20 mg/L rhodamine B solution; after 5 hours, 95% of rhodamine B is removed.

Embodiment 6

Figure 6:
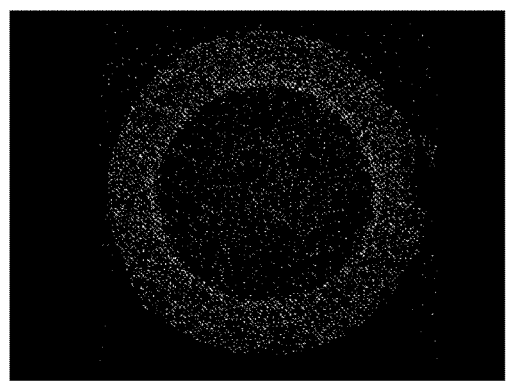
FIG. 6 is the SEM image of the material prepared in embodiment 6.

Adding 5 g resin D-201 into 0.1 mol/L $CdCl_4^{2-}$ solution, and keeping the solid-liquid ratio at 0.1 g/L; oscillating the mixture, leaving $CdCl_4^{2-}$ and the resin for 24 hours of ion exchange reaction and then filtering the mixture; mixing the material so obtained with 1.0% $Na_2S$ solution, leaving for 1 minute of reaction under ultrasonic oscillation, and then washing the material with distilled water; vacuum drying the material at 40° C. for 24 hours; the nanosized CdS so obtained is distributed around the outer part of the resin support. The depth of distribution is about 40% of the section radius of the support; the SEM image of this material is shown in FIG. 6.

The composite material so obtained is utilized to degrade 50 mL of 20 mg/L rhodamine B solution; after 6 hours, 95% of rhodamine B is removed.

Embodiment 7

Figure 7:
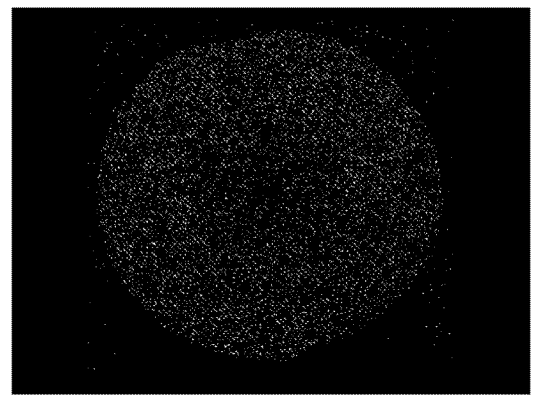
FIG. 7 is the SEM image of the material prepared in embodiment 7.

Adding 5 g resin D-201 into 0.1 mol/L $CdCl_4^{2-}$ solution, and keeping the solid-liquid ratio at 0.1 g/L; oscillating the mixture, leaving $CdCl_4^{2-}$ and the resin for 24 hours of ion exchange reaction and then filtering the mixture; mixing the material so obtained with 1% $Na_2S$ solution, leaving for 1.5 minutes of reaction under ultrasonic oscillation, and then washing the material with distilled water; vacuum drying the material at 40° C. for 24 hours; the nanosized CdS so obtained is distributed around the outer part of the resin support. The depth of distribution is about 80% of the section radius of the support; the SEM image of this material is shown in FIG. 7.

The composite material so obtained is utilized to degrade 50 mL of 20 mg/L rhodamine B solution; after 6 hours, 95% of rhodamine B is removed.

Embodiment 8

Figure 8:
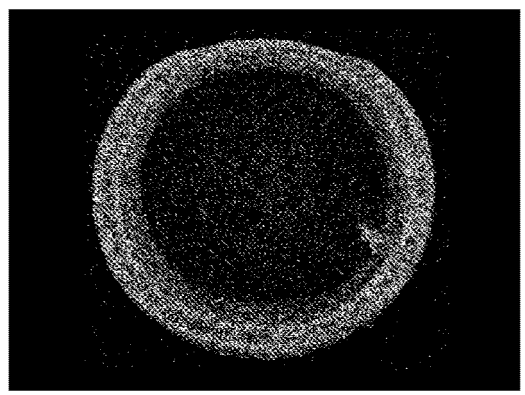
FIG. 8 is the SEM image of the material prepared in embodiment 8.

Adding 5 g resin D-201 into 2 mol/L $FeCl_4^-$ solution, and keeping the solid-liquid ratio at 10 g/L; oscillating the mixture, leaving $FeCl_4^-$ and the resin for 4 hours of ion exchange reaction and then filtering the mixture. mixing the material so obtained with 4% NaOH solution, leaving for 30 minutes of reaction under agitation, and then washing the material with distilled water; vacuum drying the material at 40° C. for 24 hours; the nanosized hydrated iron oxide so obtained is distributed around the outer part of the resin support; the depth of distribution is about 30% of the section radius of the support; the SEM image of this material is shown in FIG. 8.

The composite material so obtained is utilized to absorb a solution containing 60 mg/L of arsenic (V); the reaction reaches its kinetic balance within 100 minutes, and the pseudo second order rate constant is 0.00293m g/mg·min.

Embodiment 9

Figure 9:
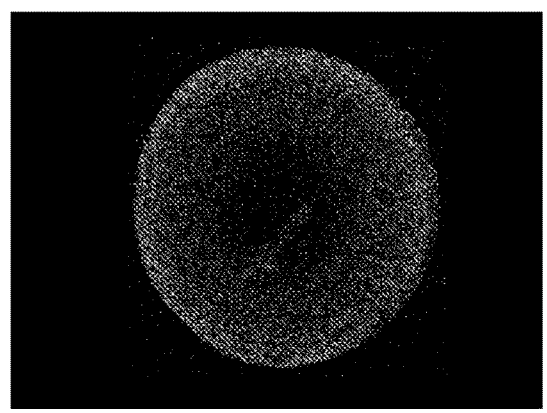
FIG. 9 is the SEM image of the material prepared in embodiment 9.

Adding 5 g resin D-201 into 2 mol/L $FeCl_4^-$ solution, and keeping the solid-liquid ratio at 10 g/L; oscillating the mixture, leaving $FeCl_4^-$ and the resin for 4 hours of ion exchange reaction and then filtering the mixture; mixing the material so obtained with 8% NaOH solution, leaving for 30 minutes of reaction under agitation, and then washing the material with distilled water; vacuum drying the material at 40° C. for 24 hours; the nanosized hydrated iron oxide so obtained is distributed around the outer part of the resin support; the depth of distribution is about 70% of the section radius of the support; the SEM image of this material is shown in FIG. 9.

The composite material so obtained is utilized to absorb a solution containing 60 mg/L of arsenic (V); the reaction reaches its kinetic balance within 80 minutes, and the pseudo second order rate constant is 0.00189 g/mg·min.

Embodiment 10

The resin D-201 mentioned in embodiments 1-9 can be replaced by D-301, NDA-900, Amberlite IRA-900, Amberlite IRA-958, Amberlite IRA-96, Purolite C-100, Purolite A500, WBR109, NDA-88 or NDA-99; the concentration of anionic complexes such as $FeCl_4^-$, $CdCl_4^{2-}$, $PdCl_4^{2-}$ in water solution is 0.1-2 mol/L and the solid-liquid ratio is 0.1-20 g/L; the deposition agent includes NaOH and $Na_2S$ and the reductive includes $NaBH_4$ and $KBH_4$, the solid-liquid ratio being 0.1-20 g/L and the concentration being 0.5%-10% by mass ratio; the reaction time is 0.5-30 minutes, and the reduction or deposition process should be conducted under ultrasonic oscillation or agitation; the metal and its compound include HFO, CdS, zerovalent iron and zerovalent palladium; as the concentration of the reductive or deposition agent increases and the reaction time extends, the distribution ring of metallic nanoparticles within the resin support increases inwardly, its depth comprising 5%-10% of the section radius of the support resin.

What is claimed is:

1. A method for regulating a distribution of metallic compound nanoparticles within a resin support, consisting of the following steps:
    using a styrenic or acrylic ion exchange resin bearing basic functional groups as the resin support;
    introducing an anionic complex in a water solution onto the resin support through an ion exchange process, wherein the anionic complex is selected from the group consisting of $FeCl_4^-$, $CdCl_4^{2-}$ and $PdCl_4^{2-}$;
    providing a reductive or deposition agent, wherein the reductive or deposition agent is fixating the metallic compound nanoparticles within the resin support through a reduction or deposition process;
    forming a distribution ring within the resin support consisting of the metallic compound nanoparticles; and
    increasing a concentration of the reductive or deposition agent over the reaction time to inwardly increase a depth and a density of the distribution ring.

2. The method for regulating the distribution of metallic compound nanoparticles within the resin support as defined in claim 1, wherein the styrenic or acrylic ion exchange resin is a matrix of the support resin containing tertiary ammonium groups, quaternary ammonium groups or basic heterocyclic groups and the support resin has an average pore size of 1-100 nm.

3. The method for regulating the distribution of metallic compound nanoparticles within the resin support as defined in claim 1, wherein the anionic complex has a concentration of 0.1-2 mol/L in the water solution, and a solid-liquid ratio between the resin support and the water solution containing the anionic complex is 0.1-20 g/L.

4. The method for regulating the distribution of metallic compound nanoparticles within the resin support as defined in claim 1, wherein the deposition agent is NaOH or $Na_2S$ and the reductive is $NaBH_4$ or $KBH_4$.

5. The method for regulating the distribution of metallic compound nanoparticles within the resin support as defined in claim 4, wherein the concentration of the reductive or deposition agent is 0.5%-10% by mass ratio and a solid-liquid ratio between the resin support and the water solution containing the deposition agent or the reductive is 0.1-20 g/L.

6. The method for regulating the distribution of metallic compound nanoparticles within the resin support as defined in claim 5, wherein the reaction time is 0.5-30 min.

7. The method for regulating the distribution of metallic compound nanoparticles within the resin support as defined in claim 5, wherein the metallic compound nanoparticles are hydrated iron oxide, CdS, zerovalent iron, zerovalent palladium or other composite metals.

8. The method for regulating the distribution of metallic compound nanoparticles within the resin support as defined in claim 5, wherein a depth of the distribution ring formed by the metallic compound nanoparticles within the resin support comprises 5%-100% of a section radius of the resin support.

9. The method for regulating the distribution of metallic compound nanoparticles within the resin support as defined in claim 5, wherein the deposition or reduction process is conducted under ultrasonic oscillation or agitation.

10. A method for regulating a distribution of metallic compound nanoparticles within a resin support, comprising of the following steps:
using a styrenic or acrylic ion exchange resin bearing basic functional groups as the resin support;
introducing an anionic complex in a water solution onto the resin through an ion exchange process, wherein the anionic complex is selected from the group consisting of $FeCl_4^-$, $CdCl_4^{2-}$ and $PdCl_4^{2-}$;
providing a reductive or deposition agent, wherein the reductive or deposition agent is fixating the metallic compound nanoparticles within the resin support through a reduction or deposition process
forming a distribution ring within the resin support consisting of the metallic compound nanoparticles; and
increasing inwardly, both a depth and a density of the distribution ring as a concentration of the reductive or deposition agent increases and a reaction time extends.

11. The method for regulating the distribution of metallic compound nanoparticles within the resin support as defined in claim 10, wherein the styrenic or acrylic ion exchange resin is a matrix of the support resin containing tertiary ammonium groups, quaternary ammonium groups or basic heterocyclic groups and the support resin has an average pore size of 1-100 nm.

12. The method for regulating the distribution of metallic compound nanoparticles within the resin support as defined in claim 10, wherein the anionic complex has a concentration of 0.1-2 mol/L in the water solution, and the solid-liquid ratio between the resin support and the water solution containing the anionic complex is 0.1-20 g/L.

13. The method for regulating the distribution of metallic compound nanoparticles within the resin support as defined in claim 10, wherein the deposition agent is NaOH or $Na_2S$ and the reductive agent is $NaBH_4$ or $KBH_4$.

14. The method for regulating the distribution of metallic compound nanoparticles within the resin support as defined in claim 13, wherein the concentration of the reductive or deposition agent is 0.5%-10% by mass ratio; the solid-liquid ratio between the resin support and the solution containing the deposition agent or the reductive is 0.1-20 g/L.

15. The method for regulating the distribution of metallic compound nanoparticles within the resin support as defined in claim 14, wherein the reaction time is 0.5-30 min.

16. The method for regulating the distribution of metallic compound nanoparticles within the resin support as defined in claim 14, wherein the metallic compound nanoparticles are hydrated iron oxide, CdS, zerovalent iron, zerovalent palladium or other composite metals.

17. The method for regulating the distribution of metallic compound nanoparticles within the resin support as defined in claim 14, wherein the depth of the distribution ring formed by the metallic compound nanoparticles within the resin support comprises 5%-100% of a section radius of the resin support.

18. The method for regulating the distribution of metallic compound nanoparticles within the resin support as defined in claim 14, wherein the deposition or reduction process is conducted under ultrasonic oscillation or agitation.

* * * * *